United States Patent Office 2,918,956
Patented Dec. 29, 1959

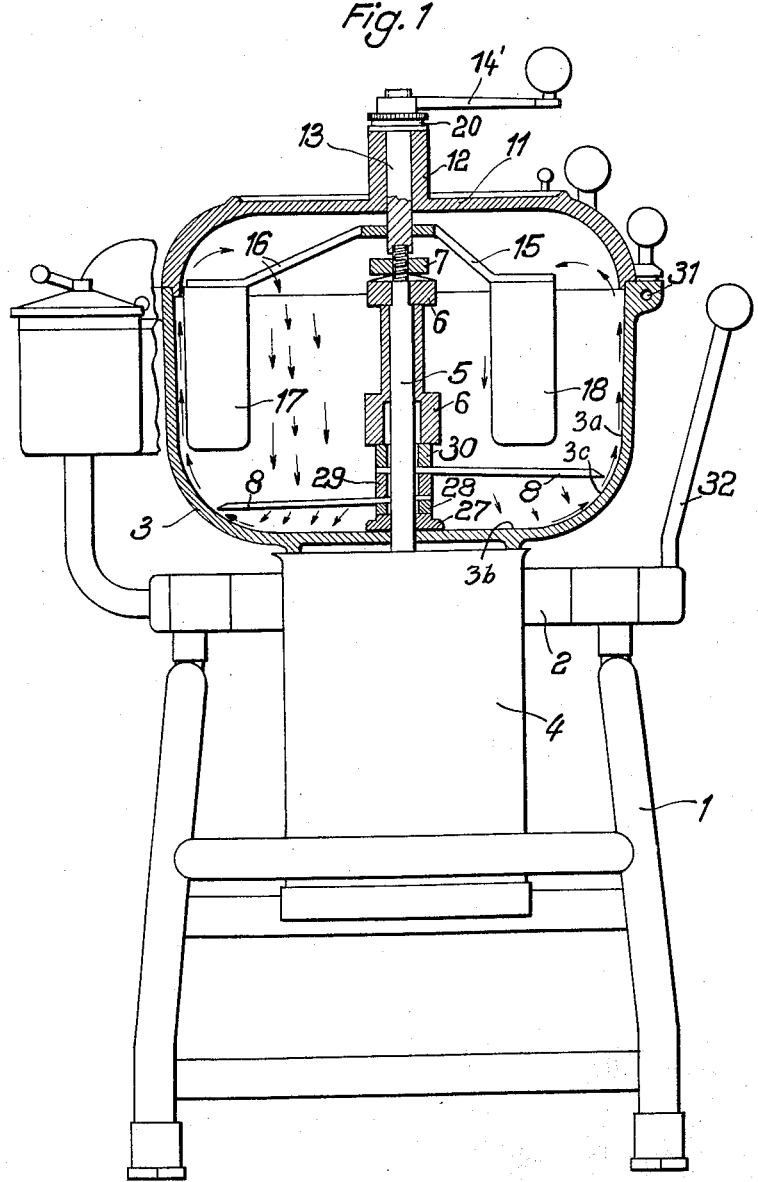

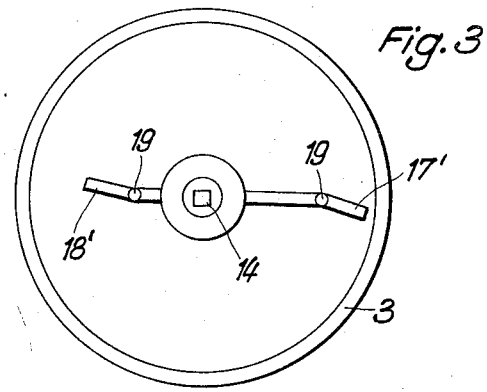
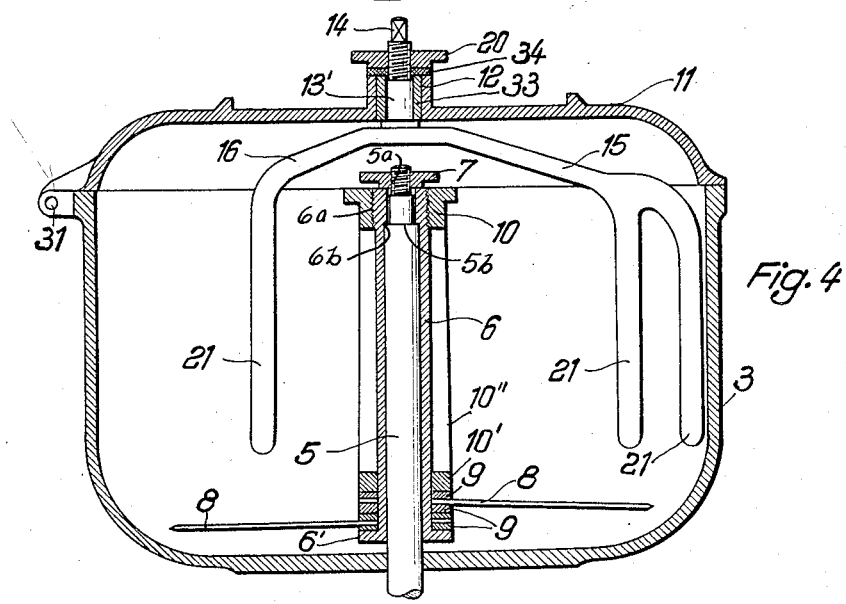
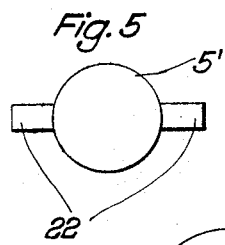
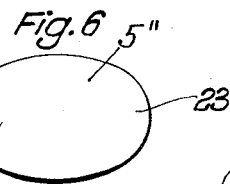
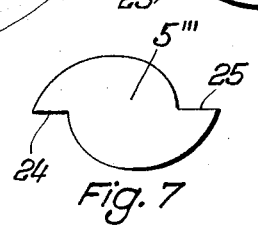
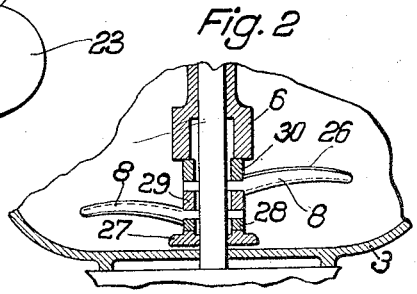

2,918,956

MEAT CUTTER

Fritz Otto, Hameln (Weser), Germany, assignor to A. Stephan u. Sohne, Hameln (Weser), Germany Application September 23, 1954, Serial No. 457,931

Claims priority, application Germany September 26, 1953

8 Claims. (Cl. 146—68)

This invention relates to a meat cutter of the type in which a vertical shaft carrying cutter knives or mixing blades is mounted for rotation in a stationary bowl as disclosed in my copending patent application, Serial No. 646,106 filed March 14, 1957, now Patent 2,894,551.

It is an object of the present invention to provide a cutter of the type referred to having a particularly high efficiency.

A special object of the present invention is to provide means for circulating the material in the bowl, in such a manner that the knives or mixing blades move the material downwards, simultaneously flinging it outwards, whereby it is caused to move up the wall and then drops back into the range of the knives.

With these and further objects in view my novel meat cutter comprises a stationary bowl of circular cross section having a closed bottom wall, a coaxial vertical cutter shaft mounted for rotation in said bowl, means for rotating said shaft, and a plurality of knives interchangeably mounted on said shaft and ending short of the wall of the bowl, said knives being inclined downwardly and rearwardly at an angle to the closed bottom of the bowl so that the material engaged by the knives is urged towards the bottom of the bowl and owing to the centrifugal effect is simultaneously forced towards the wall of the bowl in a radial direction, urged upwards between the wall of the bowl and the knives by the succeeding material, moved towards the center of the bowl on a curved path, and thus again fed to the knives.

Other and further objects, features and advantages of the invention will be pointed out hereinafter and appear in the appended claims forming part of the application.

In the accompanying drawings several now preferred embodiments of the invention are shown by way of illustration and not by way of limitation.

Fig. 1 is a side view, partly in section, of a meat cutter including its supporting frame, Fig. 2 is a fragmentary section of a cutter disk or bowl with cutting knives whose cutting edges are upwardly inclined, Fig. 3 is a plan view of a modification of the cutter bowl, with the cover removed, Fig. 4 is a cross sectional view similar to the upper portion of Fig. 1 showing a cutter bowl with inserted stirring fingers, and Figs. 5 to 7 are end views of various possible forms of the cutter shaft.

Similar reference numerals denote similar parts in the different views.

Referring now to the drawings in greater detail, and first to Fig. 1, it will be seen that a cutter bowl 3 of circular cross section is mounted in a frame 2 pivotally supported on a supporting framework 1. The bowl 3 has a cylindrical side wall 3a and a bottom 3b which curves upwardly at its periphery in a curved portion 3c which merges smoothly into the side wall 3a. A vertical rotary shaft 5 traverses the bottom of the bowl 3 and is adapted to be driven by a motor 4 secured to said bottom. The frame 2 with the bowl 3 can be tilted by a lever 32. Mounted on the shaft 5 are spacer disks 27, 28, 29, 30, and a mandrel 6, said disks and said mandrel being held in position by a nut 7 threadably engaged on the screw-threaded upper end of the cutter shaft 5. Cutter blades or knives 8 are arranged on the shaft 5 and clamped between the disks 28, 29, 30, as shown, the end faces of said disks being slightly chamfered so as to hold the knives 8 in an inclined position. Said knives may be replaced by mixing blades having no cutting edges but for the rest being shaped substantially like the knives. Moreover, the mandrel need not be employed and the blades can be mounted on the shaft 5 in known manner, not shown.

As shown in Fig. 2 in greater detail, the knives 8 are disposed in such a way that their cutting edges 26 are upwardly inclined.

The bowl 3 is closed by a vaulted cover 11 hinged to to the bowl at 31 and formed with a hub or sleeve-shaped extension 12 for reception of a shaft 13 whose lower end is formed with a central bore for concentric engagement with the upper end of the shaft 5 while a crank 14' is non-rotatably secured to the upper end of shaft 13. Fixedly mounted on the lower end of shaft 13 is a carrier member having two arms 15 and 16 of different radial extension, each of said arms carrying a guide vane or baffle surface forming a stirring element 17, or 18, respectively.

The meat cutter hereinbefore described operates as follows: During operation of the cutter the knives 8 are rotated at a relatively high speed of, for instance, 2800 r.p.m. by the motor 4, whereby the material to be treated is also revolved or circulated, moved downwards owing to the slope of the knives (Fig. 2) and centrifuged in an outward direction. The material is thus caused to move up the correspondingly shaped outer wall 3a of the bowl 3 and drops back into the reach or range of the knives, as indicated by the arrows. The guide vanes 17, 18, normally rotate idly or lightly with the material revolved by the knives 8, more particularly if the mass is relatively liquid.

On the other hand, if a more coherent material, for instance, raw sausage, is to be worked, the guide vanes 17, 18 can be additionally rotated by the crank 14', or they can be held in a stationary position, whereby the mass to be worked is intensively moved away from the wall 3a of the cutter bowl 3, towards the center thereof, and thereby effectively fed to the cutter knives 8. As will be seen from Fig. 3 in a modified form of my novel meat cutter, each of the vanes 17', 18', may be mounted on a vertical pivot 19 in such a way that its angle of incidence can be adjusted in accordance with the properties of the material to be treated. Adjustment of the blades is effected by turning them about the pivots 19 to the desired angle.

As is well known, in the production of certain types of sausages, more particularly of those known as hot sausage, ice must be added to the sausage mass. This ice hitherto was disintegrated in a separate ice milling machine and then introduced into the cutter. Thus, in addition to the cutter a separate appliance had to be provided, requiring additional space and attendance.

According to a modified form of my novel meat cutter, this is avoided by substituting for the guide vanes a stirring arm provided with fingers, prongs, or the like and being adapted to be rotated by a drive arranged on the cover of the bowl, in such a way that the ice which has been crushed by the high-speed rotation of the mixing blades or of the knives in the cutter and centrifuged against the wall of the bowl, is redistributed.

A modification of this type is shown in Fig. 4. The shaft 13' is rotatably mounted in a hub-shaped extension 12 of the cover 11, by a nut 20 threadably engaged on a screw-threaded portion of shaft 13', a sleeve 33 and a washer 34 being inserted as shown, in such a way that the shaft 13' can be easily removed or replaced by a shaft 13 carrying guide vanes 17, 18, as per Fig. 1. The upper end of shaft 13' is formed with a square-shaped portion 14 for attachment of a crank 14', Fig. 1. The arms 15 and 16 of shaft 13' again are of different radial length, but they are formed in this case with vertical prongs or fingers 21 arranged at different radial distances from the center axis. The knives 8 are clamped between chamfered spacing washers 9, in an inclined direction, the lowermost washer 9 being supported on a flange 6' of the mandrel 6, while the uppermost washer 9 is urged downwards by a clamping member whose upper and lower annular portions 10 and 10' are connected by rims 10" as shown, the upper portion 10 being threadably engaged on a male thread 6a of mandrel 6 which in its turn is secured on shaft 5 by a nut 7 threadably engaged on an upper threaded end portion 5a of shaft 5 and urging an inner shoulder 6b of mandrel 6 into engagement with an outer shoulder 5b of shaft 5.

The cutter shown in Fig. 4 operates in the same manner as that shown in Figs. 1 to 3, except that the ice disintegrated by the knives 8 and flung against the wall of the bowl, is redistributed by the rotating fingers 21.

According to a further important feature of the present invention, the rotary cutter shaft is formed with one or more axially extending radial projections adapted to form, during the rapid rotation in the material, an upwardly directed air discharge channel on the side of the projections to the rear of their leading faces. Various embodiments of such formation of the cutter shaft are shown in Figs. 5–7. These projections extend from the blades to substantially the top of the shaft. Whenever a mandrel 6 is used in the construction of the meat cutter it is provided with the radial projections.

According to Fig. 5, the axially extending projection may take the form of a pair of axially directed ribs 22 as shown on shaft 5', while Fig. 6 shows a shaft 5" of elliptic cross section, having a pair of symmetrically arranged bulges 23.

Fig. 7 shows a form in which the shaft 5''' is formed with a pair of cams 24, 25.

It will be understood that if a shaft of this cross section is rotated in the material to be disintegrated, at a high speed, a vertical channel partaking in the rotation will be formed, through which channel the air automatically worked into the material in the cutting and mixing process is permitted to escape.

The material introduced into the cutter bowl 3 therefore is not only disintegrated by the rapidly rotating knives 8, but simultaneously it is advanced or forwarded by the knives in a downward direction towards the bottom of the bowl, rising from there, under action of the succeeding material, on the cylindrical wall of the bow, and finally dropping back into the interior of the bowl where it gets again into the reach of the knives 8.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

I claim:

1. A meat cutter comprising a stationary bowl of circular cross section and having a vertical side wall and a bottom which curves upwardly at its periphery and merges smoothly into the side wall, a coaxial vertical cutter shaft extending up through the bottom of said bowl and projects upwardly substantially to the top of said bowl, means below said bowl for rotating said shaft, a plurality of knife blades mounted on said shaft for rotation therewith, said blades being mounted near the bottom of said bowl and extending substantially to the side wall, said blades being inclined downwardly and rearwardly so that material being cut is urged toward the bottom of the bowl and flows radially outwardly and upwardly along the side wall, a cover for said bowl, baffle surfaces forming stirring elements rotatably mounted on said cover and projecting longitudinally down into said bowl and spaced radially inwardly of the bowl in position to deflect and guide material from said side wall toward the center of the bowl so as to be returned to the zone of rotation said blades thereby to resubject the material being cut to the cutting action of the blades, and means for rotating said stirring elements relative to said cover.

2. A meat cutter according to claim 1, in which said stirring elements are disposed at different distances from the axis of the bowl, one of the elements projecting downwardly into the bowl, adjacent to and substantially parallel with the side wall.

3. A meat cutter according to claim 1, in which said stirring elements comprise longitudinally extending vanes rotatably mounted to turn about vertical axes offset from the axis of the bowl to vary the angle of said vanes with respect to radial planes passing through said vertical axes and the axis of the bowl.

4. A meat cutter according to claim 1, in which said stirring elements are disposed at different distances from the axis of the bowl, at least one of said elements being bifurcated forming a pair of spaced fingers projecting downwardly into the bowl substantially parallel with the side wall and being mounted more closely adjacent thereto than the other elements.

5. A meat cutter according to claim 1, in which a portion of said shaft extending from said blades to the top of the bowl is provided with at least one axially extending radial projection adapted, on rotation of said shaft, to form in the material being treated an upwardly extending air channel permitting the escape of air entrapped in the recirculating material.

6. A meat cutter according to claim 5, in which said projection comprises at least one axially extending radial rib on said shaft.

7. A meat cutter according to claim 5, in which said shaft is of oval cross section.

8. A meat cutter according to claim 5, in which said projection in cross section comprises a cam-shaped lobe with a substantially radial face and a curved face.

References Cited in the file of this patent

UNITED STATES PATENTS

| | | |
|---|---|---|
| 2,203,672 | Chester | June 11, 1940 |
| 2,284,155 | Landgraf | May 26, 1942 |

FOREIGN PATENTS

| | | |
|---|---|---|
| 135,210 | Great Britain | July 22, 1920 |
| 275,361 | Switzerland | Aug. 1, 1951 |